United States Patent [19]

Samuelson et al.

[11] 4,035,346

[45] July 12, 1977

[54] CONDUCTIVE N-ALKYL POLYAMIDE HAVING UNITS CONTAINING PHOSPHONIUM SULFONATE GROUPS

[75] Inventors: Harry Vaughn Samuelson, Wilmington; Gurdial Singh, Hockessin, both of Del.

[73] Assignee: E. I. Du Pont de Nemours and Co., Wilmington, Del.

[21] Appl. No.: 735,099

[22] Filed: Oct. 22, 1976

Related U.S. Application Data

[60] Division of Ser. No. 552,867, Feb. 25, 1975, Pat. No. 4,006,123, which is a continuation-in-part of Ser. No. 403,221, Oct. 3, 1973, abandoned.

[51] Int. Cl.² ........................................ C08G 69/42
[52] U.S. Cl. ............................ 260/78 R; 260/75 S; 260/75 P; 260/47 P; 260/78 A; 260/78 S; 260/49; 260/DIG. 16; 260/DIG. 19; 260/DIG. 21; 428/373; 428/395

[58] Field of Search .......... 260/78 R, 78 A, 78 SC, 260/DIG. 16, DIG. 19, DIG. 20

[56] References Cited

U.S. PATENT DOCUMENTS

| | | | |
|---|---|---|---|
| 3,496,147 | 2/1970 | Cubbon | 260/78 S |
| 3,514,498 | 5/1970 | Okazaki et al. | 260/78 R |
| 3,637,552 | 1/1972 | Bryan | 260/45.7 P |
| 3,732,183 | 5/1973 | Popp et al. | 260/75 P |

FOREIGN PATENT DOCUMENTS

47-22334  6/1972  Japan

*Primary Examiner*—Howard E. Schain
*Assistant Examiner*—W. C. Danison, Jr.

[57] ABSTRACT

An antistatic synthetic polymer having a $T_g$ (NMR) of less than 25° C., a log $R_s$ of less than 10 and containing phosphonium sulfonate groups can be used to improve the conductivity of synthetic fiber-forming polymers.

3 Claims, No Drawings

CONDUCTIVE N-ALKYL POLYAMIDE HAVING UNITS CONTAINING PHOSPHONIUM SULFONATE GROUPS

CROSS-REFERENCE TO RELATED APPLICATION

This application is a division, of application Ser. No. 552,867, filed Feb. 25, 1975, now U.S. Pat. No. 4,006,123 which is a continuation-in-part of our application Ser. No. 403,221, filed Oct. 3, 1973 now abandoned.

BACKGROUND OF THE INVENTION

This invention relates to the use of polymers containing organic phosphonium sulfonate units to improve the conductivity of synthetic, fiber-forming polymers.

The use of ionic compounds to improve the antistatic performance of polyether-polyamide block copolymers and polyethers is shown in U.S. Pat. No. 3,514,498 and British Patent 1,179,266, respectively. The use of polyalkoxylated compounds and phosphonium phosphates or phosphonium bromides in fiber-forming polyamides for improved antistatic property is shown respectively in U.S. Pat. Nos. 3,637,552 and 3,696,078. U.S. Pat. No. 3,732,183 discloses that fiber-forming polyesters can be modified with phosphonium sulfonate chain links. This patent is primarily directed to improving dyeability and also mentions that antistatic properties can be improved. Antistatic composite filaments having polyether-polyamide block copolymers as sheath or core are disclosed in U.S. Pat. No. 3,558,419.

It has now been found that the conductivity of a defined class of polymeric antistatic modifiers can be greatly enhanced by copolymerization with certain organic phosphonium sulfonates.

SUMMARY OF THE INVENTION

The present invention provides a synthetic polymer with ester or amide chain extending linkages, having a $T_g$ (NMR) of less than 25° C. and containing a minor amount, preferably at least 0.01 mol percent up to about 50 mol percent of phosphonium sulfonate groups based on the number of mols of dicarboxylic acid units and/or aminocarboxylic acid units and/or hydroxycarboxylic acid units in the polymer chain.

The synthetic polymers of the invention are selected from the group of N-alkyl polyamides, aliphatic polyesters and polyether esters wich have within the polymer chain or at the chain ends, units containing phosphonium sulfonate groups.

Preferred units containing phosphonium sulfonate groups are of the formula:

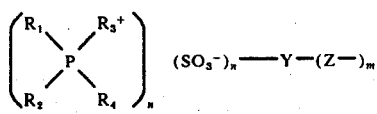

where $R_1$, $R_2$, $R_3$ and $R_4$ represent monovalent hydrocarbon groups, preferably from 1 to 18 carbon atoms each and with the proviso that $R_1$ and $R_2$ may jointly represent an alkylene group, $-Y-$ is a hydrocarbon group of up to 24 carbon atoms in which any unsaturation is aromatic and which may be interrupted by oxygen, sulfonamide or sulfonyl groups, $-Z-$ is selected from the group

$-O-$ and

and $n$ and $m$ are 1 or 2. Where $n$ or $m$ is 2, the groups, e.g., Z groups, are attached to different carbon atoms of Y. $R_1$, $R_2$, $R_3$ and $R_4$ may be the same or different but are alkyl when the unit is part of an N-alkyl polyamide. Preferably $R_1$, $R_2$ and $R_3$ will be the same. R is hydrogen or an alkyl group of 1–18 and preferably 1–4 carbon atoms. The $(SO_3^-)_n$ $Y-(Z-)_m$ unit is preferably an aromatic monosulfonate unit where $m$ is 2 and $-Z-$ is two carbonyl linking groups. The polymers of the invention have a log $R_s$ of less than 10. Preferred polymers will have a log $R_s$ of less than 8.

The conductive polymers of the invention provide antistatic fibers when contained either as a separate, dispersed phase or as a continuous core within the fibers. When dispersed throughout the fiber, they are particularly effective when present in the amount of from 2 to 15% by weight of the fiber. When contained within the fiber as a core consisting essentially of the conductive polymer throughout the length of the fiber, the core may constitute from 0.1 to 50% of the fiber cross-section.

DETAILED DESCRIPTION OF THE INVENTION

The conductive polymers of this invention have a log $R_s$ as defined below, or less than 10 and have a fluid-like mobility at normal ambient temperatures as reflected by having a glass transition temperature as determined by nuclear magnetic resonance peak ratio, herein called $T_g$ (NMR), less than 25° C. Such glass transition temperatures can be approximated by using less complicated techniques such as differential thermal analysis for convenience. Such materials are readily and permanently deformable when stressed and vary in their physical nature from rubbery compositions to low melting solids and liquids. They are not suitable for forming useful textile filaments by themselves. For processibility reasons in the production of filaments, it is desirable that the polymers of this invention have a viscosity of at least 10 centipoises at the filament spinning temperature to be employed which is commonly above 250° C., and more desirably a viscosity of at least 100 centipoises. Their melt viscosity can be controlled by molecular weight and by the use of branching or cross-linking agents.

The $T_g$ of these polymers may be adversely affected for the purposes of this invention by increasing aromatic character in the polymer. Surprisingly, aromaticity in the phosphonium sulfonate containing units is more than offset in its effect on conductivity by the increase in conductivity provided by the phosphonium sulfonate group. Crystallinity or crystalline blocks in the polymer can retard conductivity and if excessive, the log $R_s$ will be greater than 10.

The conductive polymers of the invention are prepared by the process wherein a phosphonium sulfonate having at least one polymer-reactive group (carbonamide- or carboxylester-forming group) is mixed with polymer-forming reactants of polymers with ester or amide chain-extending linkages selected from the group consisting of N-alkyl polycarbonamides, aliphatic polyesters and polyetheresters, the mixture is subjected to polymerization conditions and the resulting modified polymer is isolated. Said polymer-forming reactants include preformed or partially formed polymers.

Polymer-forming reactants used to prepare conductive N-alkyl polycarbonamides are disclosed in Br. 1,237,589. They are aliphatic N-alkylated diamines and aliphatic dicarboxylic acids and/or N-alkyl aminocarboxylic acids or their amide-forming derivatives. Thus, suitable diamines include N,N'-diethyl-, -diisobutyl-, -di-n-butyl-, -dihexyl-, -diheptyl-, -didecyl- and -distearyl- ethylene, propylene, tetramethylene, hexamethylene, nonamethylene and decamethylene diamines and the corresponding mono-N-alkyl diamines. Suitable dicarboxylic acids include succinic, glutaric, adipic, pimelic, suberic, azelaic, sebacic, dodecanedioic and higher dicarboxylic acids and also such acids as N-N'-bis(ω-carboxyalkyl) piperazine. Suitable aminocarboxylic acids include N-methyl-, -ethyl-, -isobutyl-, -n-butyl-, -hexyl-, -decyl-, etc., 11-aminostearic and ω-amino-stearic acids.

The molecular weight of these N-alkyl polycarbonamides may be regulated when desired by the use of viscosity stabilizers as is known to those in the art. Particularly suitable stabilizers are monofunctional carboxylic acids containing from 2 to 26 carbon atoms and monofunctional primary and secondary amines containing alkyl groups with from 1 to 18 carbon atoms. Suitable viscosity stabilizers are acetic, propionic, butyric, valeric, pivalic, enanthic, pelargonic, decanoic, myristic, palmitic, stearic, benzoic, cyclohexanecarboxylic acids and stearyl and distearylamines.

Some suitable compositions for forming conductive polyether-esters are disclosed in Br. 1,176,648 and others are disclosed herein. Reactants and conditions for preparation of polyether-esters are shown in U.S. Pat. No. 3,655,821, however, for the purposes of the present invention it is preferred that the polyglycol reactant should be polyethyleneglycol of from 200 to 2000 molecular weight and that the diacid be either aliphatic or aromatic. The polymerization conditions are described in said U.S. Pat. No. 3,655,821 or are disclosed herein. Thus, the diacid (or its ester-forming derivative) may be aliphatic, e.g., succinic, sebacic or dodecanedioic acid or it may be aromatic, e.g., terephthalic acid. Thus, the polyether esters are esters of polyethers and diacids.

Compositions used to prepare the aliphatic polyesters are aliphatic glycols having 2 to 12 carbon atoms and aliphatic dibasic acids, or their ester-forming derivatives, having 4 to 36 carbon atoms or hydroxycarboxylic acids of from 5 to 12 carbon atoms or equivalent such as caprolactone. Aromatic dibasic acids, or their ester-forming derivatives, may be used in conjunction with the aliphatic dibasic acids, however, excessive aromatic character in the polymer may produce as increase in the log $R_s$ value of the product beyond 10. As suitable reactants for preparing these polyesters there may be mentioned ethylene glycol; 1,3-propanediol; 1,4-butanediol; 1,6-hexanediol; 2,2-dimethyl-1,3-propanediol; 2-methyl-2-ethyl-1,3-propanediol; 2,2-diethyl-1,3-propanediol; 2-methyl-2-propyl-1,3-propanediol; 2,2,4-trimethylhexanediol; 2,4,4-trimethylhexanediol; glutaric acid, succinic acid, adipic acid, azelaic acid, dodecanedioic acid, terephthalic acid and dimer acid (defined below) and their ester-forming derivatives.

Branching agents, i.e., polymer reactants having more than two functional groups may be added when it is desired to increase the viscosity of the antistatic polymers. As suitable branching agents there may be mentioned pyromellitic dianhydride, trimethylol propane, pentaerythritol and bis(hexamethylene)triamine.

The organic phosphonium sulfonate to be reacted with the other polymer-forming ingredients may contain 1 or 2 sulfonate groups. The sulfonate group may be attached to a hydrocarbon group which may be aromatic or aliphatic (including cycloaliphatic) free of unsaturation. The hydrocarbon group may be interrupted by ether, sulfonamide or sulfonyl groups. Thus, the sulfonate group may be attached to one of two or more hydrocarbon groups which are connected by ether, sulfonamide or sulfonyl groups. For example, they are contemplated phosphonium salts of alkyl- and arylsulfonates as well as of aryloxyalkylsulfonates, alkyloxyarylsulfonates, and arylsulfonamidoalkylsulfonates. The hydrocarbon or interrupted hydrocarbon group bears one or two reactive groups which can form carbonamide or carboxylateester linkages with the polymer-forming reactants. The reactive groups are carboxyl, carboalkoxy, mono- or secondary amine, or hydroxyl. The amine or hydroxyl groups may not be attached directly to aromatic hydrocarbon.

The organic phosphonium sulfonates are conveniently prepared by known reactions from known compounds, generally by metathesis reactions involving ion exchange to obtain the desired anion. For example, one may react in aqueous medium, a phosphonium halide with an alkali metal sulfonate and separate the phosphonium sulfonate from the aqueous medium. The alkali metal sulfonates and the phosphonium chlorides are commercially available or readily prepared.

As suitable phosphonium sulfonate reactants there may be mentioned methyltriphenylphosphonium 3,5-dicarbomethoxybenzenesulfonate; tetra-(n-butyl)-phosphonium 3,5-dicarboethoxybenzenesulfonate; methyltrioctylphosphonium 3,5-dicarbomethoxybenzenesulfonate and others set forth in the examples below. The preferred salts yield a phosphonium 3,5-dicarbonylbenzenesulfonate unit in the polymer.

The presence of the phosphonium sulfonate groups in the polymer is highly effective in improving the electrical conductivity of these amorphous, fluid-like polymers. In addition, the thermal stability of the phosphonium salts is conducive to the normal processing of the polymers when used to prepare antistatic filaments, for example melt-spun polyamide and polyester antistatic filaments.

Antistatic filaments produced in accordance with this invention have the conductive polymer containing the phosphonium sulfonate groups dispersed as known in the art as minute particles distributed throughout. Alternatively the conductive polymer containing the phosphonium salt units may be present as a continuous core throughout the length of the filament or fiber. The latter method makes maximum use of the improved conductivity since the conductive system is continuous and antistatic behavior is essentially independent of the surrounding matrix.

Synthetic, fiber-forming polymers which can be made antistatic by the compositions of this invention include polymers and copolymers from the classes of polyamides, polyesters, and polyolefins.

For a significant improvement in conductivity the phosphonium sulfonate groups should be present in the polymeric antistat at a concentration of at least 0.01 mole percent based on the number of moles of dicarboxylic acid units and/or aminocarboxylic acid units and/or hydrocarboxylic acid units (i.e., residue of dicarboxylic acid or aminocarboxylic acid or functionally equivalent reactant) present in the polymer chain. Amounts of up to about 50 mole percent based on the number of moles of dicarboxylic acid units and/or aminocarboxylic acid units may be present. Mole percent phosphonium sulfonate groups reported in the examples which follow are obtained by multiplying by 100 the number obtained by dividing the number of moles of phosphonium sulfonate groups (i.e., $R_1R_2R_3R_4P^+-SO_3^-$ groups) used, by the total moles of ingredients (reactants) with 2 carboxylic acid groups or equivalent condensation functional groups, e.g., dicarboalkoxy groups. Ingredients having carboxylic acid or carboalkoxy groups are not volatile under the conditions used for polymerization and hence they appear in the polymer as dicarboxylic acid units.

Preferred compositions of this invention are the N-alkyl polyamides and aliphatic polyesters containing the phosphonium sulfonate groups because of their high electrical conductivity coupled with high thermal stability which permits their use as very small in sheaths of high melting polymers.

TESTS AND MEASUREMENTS

The specific resistance, $R_s$, is determined at room temperature on the dry (water-free) polymer containing the phosphonium salt. The polymer is dried at 100° C. in an oven at a pressure less than 50 torr for at least 12 hours. More stringent drying conditions are usually not required but may be used when convenient. The cell used for the measurements consists of a "Pyrex" glass tube of 2 ± 0.25 millimeter inside diameter and 8 millimeters outside diameter and is filled by a sucking antistat from a melt pool. Copper electrodes are inserted through rubber end-caps at each end of the tube with 33 centimeter electrode separation and the current transmitted through the sample at a potential difference of 220 volts DC is recorded using a Beckman Vibrating Reed Model 1051 microammeter. Specific resistance is calculated from the equation:

$$R_s \text{ (ohms)} = K_o/I \text{ (amps)}$$

The cell constant, $K_o$, is determined with a liquid of known specific resistance in ohm-cm. The values reported herein used $7.63 \times 10^{-2}$ as the cell constant. For convenience the $R_s$ value is reported as its $\log_{10}$ value. The lower the $R_s$ value, the higher is the conductivity of the sample.

The static propensity of antistatic filaments reported herein is determined on fabric made with them.

The filaments may be converted into woven fabric, and the static propensity determined by measuring the amount of direct current that passes through the fabric at a temperature of 22° C. and 26% relative humidity. In order to assure electrical contact between the electrode and the core-containing filaments of the fabric, it may be desirable to paint the fabric with an electrically conductive paint in the area of electrode contact. In the examples below, no conductive paint is used unless it is specifically mentioned. The ohms per square unit of area of fabric surface is determined according to the AATCC Method, 76-59 ("Technical Manual of the AATCC", Volume 41, 1965, pages B-188). This value, given log R, is the logarithm to the base 10 of the fabric resistance in ohms. Higher values indicate a greater tendency to acquire and retain an electrostatic charge. This method provides an approximate measure of static propensity. However, to compare filaments one should determine the log rho of the filaments, which takes into account differences in total yarn cross-section. Log rho is obtained from the expression:

$$\log rho \text{ (filament)} = \log R \text{ (fabric)} - \log (9 \times 10^5 D) + \log (Pd)$$

where D is the density of the polymer, P is the number of picks (filling yarn ends) per centimeter in the fabric and d is the total denier of each pick. The (Pd) value gives the amount of filling yarn in the sample. When the pick yarns contain filaments that have cores of a polymeric antistat (conductive filaments) in combination with filaments without the polymeric core antistat (nonconductive filaments), the (Pd) value is multiplied by the portion of conductive filaments in the pick to obtain the log rho reported for the conductive filaments. In the examples, the following values of D are used: 1.15 for 66 polyamide; 1.0 for 612 polyamide; 1.0 for the polyamide from bis(4-aminocyclohexyl)methane and 12-acid; 1.4 for polyethylene terephthalate; and 0.9 for polypropylene.

Fibers which produce a log rho value of 11 or less are considered to have antistatic properties with the lower values again representing the more desirable antistatic properties.

Fabrics are given a number of "home" wash-dry cycles in a tumble washing machine with a synthetic detergent in water at 38° C., spun-dried, and tumble-dried at 77° C. These cycles are referred to as "C" washes.

Static propensity of the filaments also can be determined by a measurement of decling time in a procedure referred to as the Sail Test. The Sail Test used herein measures the severity and duration of garment cling due to static under simulated use conditions. In this test, static is induced in a garment, which may be a slip, a skirt or a dress, worn over cotton briefs by a technician, by rubbing against a fabric held between two vertical poles. A polyethylene terephthalate fabric is used with polyamide garment and a poly(hexamethylene adipamide) fabric is used with a polyester garment. The time taken for the garments to uncling (or decling) while being worn during walking around the room is determined. The room is maintained at 21° C. and 20% relative humidity. The decling time is the time in minutes required for the garment to be judged comfortable with no detectable cling from static charges.

The results are reported after a number of "C" washes or after finishing. The garments containing acceptable antistatic filaments having decling times less than 10 minutes and preferably less than 2 minutes.

For carpets, the static propensity of the antistatic filaments can be determined by using the filaments to make a carpet and measuring the electrostatic voltage built up on a person walking upon a section of the carpet at 21° C. and 20% relative humidity. Filaments used in this measurement, referred to as the shuffle test, preferably should provide voltages less than 2KV. The procedure for the shuffle test is described in AATCC Test Method 134-1964 with changes adopted by the Carpet & Rug Institute, September, 1971.

The $T_g$ (NMR) is the temperature above which there is a rapid rise in the NMR narrow peak and peak ratio with an increase in temperature. The NMR peak ratio is determined from the NMR broadline spectrum measured at a given temperature on the dry polymer (e.g., dried at 125° C. for at least 15 minutes in dry nitrogen) in an atmosphere of dry nitrogen using a radio frequency of 56.4 megacycles at an attenuation setting of 17 decibels with a sweep modulation amplitude of one gauss. The NMR spectrum is measured using the nuclear magnetic resonance equipment of Varian Associates, Model V - 4302 Dual Purpose Spectrometer and their high temperature probe insert, Model Vo. V - 4331 TWL. The NMR spectrogram at a given temperature shows a broad absorption "hump" upon which is superimposed a vary narrow peak. The derivative curve of the spectrogram is recorded by the spectrometer; "peak ratio" measurements are made on this curve. The height of the narrow peak divided by the height of the "hump" gives the "peak ratio", as described in J. Polymer Science Part C, Polymer Symposia, No. 3, pp. 3–8 (1963). The precision of this peak ratio determination is about ± 0.2 and that of the $T_g$ (NMR), ± 5° C. The phosphonium sulfonate modified N-alkyl polyamides, aliphatic polyesters and polyether-esters of the invention have $T_g$ (NMR) of less than 25° C. as is also evidenced by their fluid-like, rubber-like or gummy nature.

The % core in the filament is the % of the cross-sectional area of the filament occupied by the core material. The cross-sectional area is conveniently determined by photographing a cross-section of the filament under a microscope at 50 to 1500X and determining the % core from measurement of the photograph. In the case of irregularities, the average of 5 to 10 determinations is used. For round filaments with round cores, the % core can also be determined by photographing the filaments in a longitudinal view immersed in a medium having a refractive index closely matching the refractive index of the filament, and measuring the filament and the core diameters and calculating the % core.

The expression "relative viscosity" as used herein signifies the ratio of the flow time in a viscometer of a polymer solution relative to the flow time of the solvent by itself measured in the same units at 25° C. Unless otherwise specified the relative viscosity of the polyamides is determined using an 8.4%, by weight, based on total weight, solution in 90%, by weight, based on total weight, formic acid.

Inherent viscosity, $\eta inh$, is determined from the expression:

$$\eta inh = \log_e \eta/C$$

where $\eta$ is the viscosity of a dilute solution of the polymer in m-cresol divided by the viscosity of m-cresol in the same units and at the same temperature and C is the concentration of the dilute solution in grams of polymer per 100 ml. of solution. In the examples, the temperature used is 25° C. and the value of C is 0.5.

Formulas for some of the phosphonium salts used in the examples appear below.

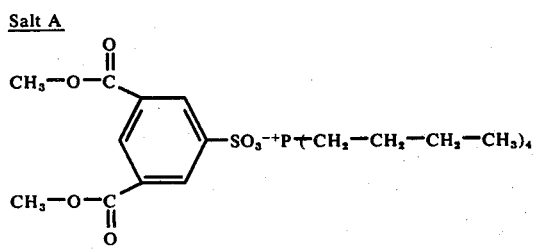

Salt A

Salt E

Salt F

Salt G

-continued

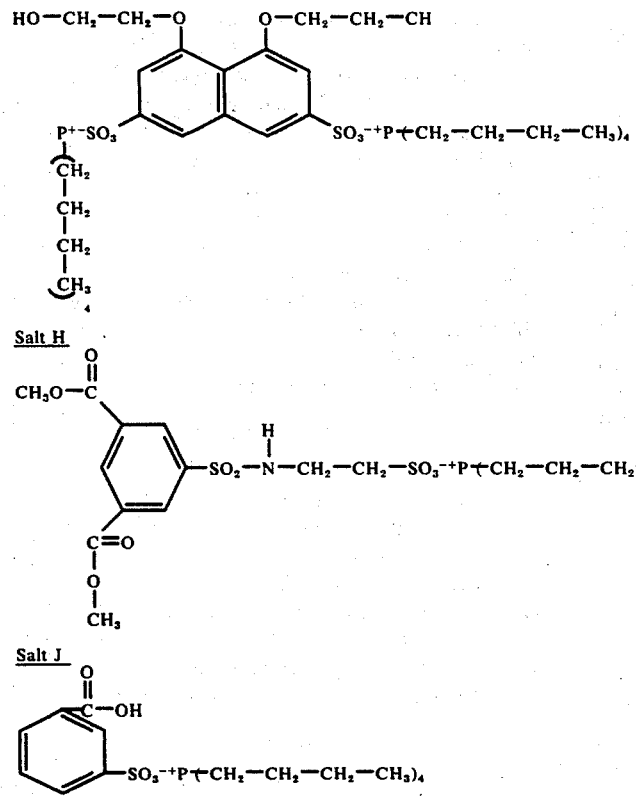

In the procedures and examples that follow, all percentages are by weight, based on total weight, unless indicated otherwise, percent core is percent by volume and all conductive polymer characterizations are made at a temperature above 25° C. except as specifically noted.

PREPARATION OF PHOSPHONIUM SULFONATE MONOMERS

Tetra-n-Butylphosphonium 3,5-Dicarbomethoxybenzenesulfonate (Salt A)

A solution of 295 grams of tetra-n-butylphosphonium chloride and 296 grams of sodium 3,5-dicarbomethoxybenzenesulfonate in 1.5 liters of water is stirred for 1 hour at 60° C. The phosphonium sulfonate separates as a clear liquid at the bottom. It is separated and dried overnight at 100° C. at a pressure less than 50 torr. On cooling to room temperature it solidifies to a white solid which melts at 73° C.

Tetraphenylphosphonium 3,5-Dicarbomethoxybenzenesulfonate (Salt B)

A solution of 21 grams of tetraphenylphosphonium bromide in 25 ml. of water at 80° C. is added to 15 grams of sodium 3,5-dicarbomethoxybenzenesulfonate in 50 ml. of water also at 80° C. The solution is cooled and crystals of tetraphenylphosphonium 3,5-dicarbomethoxybenzenesulfonate are filtered from the solution. After 18 hours drying under nitrogen at about 60° C. at a pressure less than 250 torr nitrogen, the crystals are found to melt at 203° C.

Tri-n-Octyl-n-Butylphosphonium 3,5-Dicarbomethoxybenzenesulfonate (Salt C)

Tri-n-octyl-n-butylphosphonium bromide is prepared by slowing dripping tri-(n-octyl)phosphine (740 grams) into refluxing 1-bromobutane (500 grams) in a nitrogen atmosphere. Reflux is continued one hour after final addition then the solution is cooled with stirring for about 18 hours, followed by vacuum removal of excess 1-bromobutane at 60° C. This product, 1210 grams from two successive preparations, is added to 880 grams of sodium 3,5-dicarbomethoxybenzenesulfonate in 2500 ml. of water and stirred for at least one hour at 85° C. then the heat is removed and the oil-in-water mixture is stirred for about 18 hours. The oil layer is separated from the water, rinsed with 1000 ml. of water and dried at about 80° C. at a pressure less than 2 torr for 18 hours. This product, an oil, is tri-n-octyl-n-butylphosphonium 3,5-dicarbomethoxybenzenesulfonate with 4.2% phosphorus and 4.7% sulfur by analysis.

Triphenyl-n-Octadecylphosphonium 3,5-Dicarbomethoxybenzenesulfonate (Salt D)

Triphenyl-n-octadecylphosphonium bromide is prepared by refluxing n-octadecyl bromide (1000 grams) and triphenyl phosphine (787 grams) in about 1400 ml. of toluene for 16 hours at about 110° C. The product is precipitated from the cooled solution by the addition of about 500 ml. of ethyl acetate and the crystals filtered from solution. These crystals, 1550 grams, are added to 890 grams of sodium 3,5-dicarbomethoxybenzenesulfonate in 3000 ml. of water which is heated to 80°-85° C. and stirred for one hour. The oil layer is washed twice with about 2000 ml. of room-temperature water, then dried at 50° C. under nitrogen for 16 hours at a pressure less than 100 torr. The product, triphenyl-n-octadecylphosphonium 3,5-dicarbomethoxybenzenesulfonate, solidifies on cooling.

Tetra-n-Butylphosphonium 3-(4-Carbomethoxyphenoxy)propanesulfonate (Salt E)

Sodium 3-(4-carbomethoxyphenoxy)propanesulfonate is prepared by adding sodium methoxide (54 grams) to 4-carbomethoxyphenol (152 grams) dissolved in 600 ml. of methanol followed by addition of propane sulfone (122 grams). After 2 hours of reflux, the crystals formed are filtered (186 grams) and added to tetra-n-butylphosphonium chloride (185 grams) in 400 ml. of water at 40° C. to prepare tetra-n-butylphosphonium 3-(4-carbomethoxyphenoxy)propanesulfonate. To remove this phosphonium salt from water, 70-ml. of chloroform is shaken with 70-ml. of the water solution and then separated from the water. This chloroform layer is then combined with the chloroform layer from a repeat of this procedure with 100-ml. of chloroform and a 100-ml. portion of the water solution. Evaporation of the combined chloroform extracts yields 98 g. of Salt E.

Tetra-n-Butylphosphonium 9,9-di(2-Carbomethoxyethyl)fluorene-3-Sulfonate (Salt F)

Forty three grams of tetra-n-butylphosphonium chloride and 53 grams of sodium 9,9-di(2-carbomethoxyethyl)-3-fluorenesulfonate are heated to 80° C. in 250 ml. of water with stirring. The desired product, Salt F, is obtained as an oil. The oil layer is separated from the water and dried for 16 hours at 60° C. under nitrogen at a pressure less than 10 torr. After 5 days, the oil crystallizes. These crystals melt at 96° C. and are found to contain 4.5% phosphorous and 4.3% sulfur.

1,8-Di(2-Hydroxyethoxy)naphthalene 3,6-Di(Tetra-n-Butylphosphonium)sulfonate (Salt G)

1,8-Di(2-hydroxyethoxy)naphthalene 3,6-disodium sulfonate is prepared by reacting two moles of ethylene oxide with one mole of 1,8-hydroxynaphthalene 3,6-disodium sulfonate in a concentrated water solution. This solution, 125 ml., containing about 35 grams of the ethoxylated product, is washed with 125 ml. of benzene then heated to the boil to remove impurities. Sodium chloride, 37.5 grams, in 125 ml. of water is added to the solution followed by 46 grams of tetra-n-butylphosphonium chloride. After 5 hours of vigorous stirring, the oil layer is removed and dried 18 hours at 60° C. under a pressure of less than 5 torr. This product is mixed with 23 grams of tetra-n-butylphosphonium chloride in 100 ml. of water, heated to 80° C. and then cooled. The oil layer is removed, dried at 60° C. for 18 hours under nitrogen at a pressure less than 2 torr to give 1,8-di(2-hydroxyethoxy)naphthalene-3,6-di(tetra-n-butylphosphonium)sulfonate; analyses indicate that about 40% of this product is present as the monosulfonate.

Tetra-n-Butylphosphonium 2-(3,5-Dicarbomethoxybenzenesulfonamido)ethanesulfonate (Salt H)

To 43.8 grams of 3,5-dicarbomethoxybenzenesulfonyl chloride in 150 ml. benzene is added with vigorous stirring, 50 grams of 2-aminoethanesulfonic acid in 190.5 ml. of 2 N sodium hydroxide. The mixture is stirred for an hour and then for an additional hour at 60° C. The product is isolated as a crystalline precipitate by adding sodium chloride (60 grams) and 100 ml. of water to the aqueous layer. To separate the product from some undissolved sodium chloride, the product is dissolved in 500 ml. methanol filtered, then reprecipitated by adding 600 ml. of ether. This product is dried 16 hours at 60° C. under nitrogen at a pressure of less than 10 torr. The dried product (20 grams) is mixed with tetra-n-butylphosphonium chloride (15 grams) in 35 ml. of water to obtain tetra-n-butylphosphonium 2-(3,5-dicarbomethoxybenzenesulfonamido)ethanesulfonate. This phosphonium sulfonate is extracted from the water solution by vigorously shaking 30 ml. of chloroform with the solution. The chloroform layer yields the phosphonium sulfonate upon evaporation and it contains 5.3% phosphorous, 9.1% sulfur and 2.1% nitrogen.

Tetra-n-Butylphosphonium 3-Carboxybenzenesulfonate (Salt J)

Tetra-n-butylphosphonium 3-carboxybenzenesulfonate is prepared by mixing tetra-n-butylphosphonium chloride (58.8 grams) with sodium 3-carboxybenzenesulfonate (48.8 grams) in 250 ml. of water at 60° C. The oil layer which forms is removed after cooling the solution and is dried at 60° C. at a pressure less than 5 torr. The phosphonium sulfonate crystallizes upon standing at 25° C. and has a melting point of 62° C.

EXAMPLE 1

This example illustrates the use of Salt A to improve the conductivity of the polymer of N,N'-diethylhexamethylene diamine and dodecanedioic acid.

In three separate runs, the salt of the diamine and the acid, Salt A, and bis(hexamethylene) triamine (hereinafter BHMT) are polymerized in a sealed, heavy-walled polymer tube at 215° C. for 2 hours and then at 283° C. at a pressure less than 5 torr for 4 hours. The Log $R_s$ value of the resulting polymers is given in Table I.

TABLE I

| Run | Phosphonium Sulfonate Mole % | BHMT, Mole % | Log $R_s$ |
|---|---|---|---|
| I | 4.8 | 2.6 | 7.0 |
| II | 8.3 | 3.7 | 6.7 |
| III | 14.1 | 8.2 | 6.5 |

In 4 additional runs, an autoclave is charged with 3218 grams of N,N'-diethylhexamethylene diamine and dodecanedioic acid salt, 129 grams of N,N'-diethylhexamethylene diamine, 17.2 grams of BHMT, Salt A, 7.0 grams of boric acid, 20 grams of formic acid, and 4.5 grams of potassium phenylphosphinate. The autoclave is purged with nitrogen and heated at 215° C. for 2 hours with an agitator speed of 6 to 8 rpm. The pressure generated in the autoclave during the preceding step is about 10 kilograms per square centimeter gage. The pressure inside the autoclave is reduced to atmospheric over a period of 60 minutes, and the temperature is raised to 300° C. The batch is held at this temperature for 2 hours under a pressure of less than 2 torr. The agitator is turned off and the pressure is brought to atmospheric with nitrogen. The polymer is extruded at 275° C. under a blanket of nitrogen. The concentration of the phosphonium sulfonate, the relative viscosity and the log $R_s$ of the polymers are shown in Table II.

TABLE II

| Run | Phosphonium Sulfonate Mole % | Relative Viscosity | Log $R_s$ |
|---|---|---|---|
| IV | 3.61 | 17.4 | 7.1 |
| V | 2.25 | 27.1 | 7.2 |
| VI | 1.54 | 36.2 | 7.3 |
| VII | 1.50 | 68.9 | 7.5 |
| — | None | | 9.0 |

EXAMPLE 2

This example illustrates the use of Salt A to improve the conductivity of a polyether-ester.

In Run I, an autoclave equipped with an agitator is charged with 5550 grams of dodecanedioic acid, 4640 grams of polyethylene glycol of 200 average molecular weight, 1160 grams of Salt A, 375 grams of 2-ethyl-2-hydroxymethyl-1,3-propanediol (branching agent), 11 grams of p-toluenesulfonic acid, and 11 grams of manganese acetate. The autoclave is purged with nitrogen. The reactants are then heated at 200° C. and the agitator is started at 15 rpm. The batch is held at 200° C. for 3 hours under a gentle bleed of nitrogen. The pressure is then reduced to less than 5 torr and the temperature is raised to 240° C. over a period of about 60 minutes. It is held at 240° C. for 6 hours at a pressure less than 5 torr. The batch is then brought to atmospheric pressure with nitrogen and extruded at 120° C. under a blanket of nitrogen. The yield is about 26 lbs. (11.8 kilograms). The inherent viscosity of this material is about 1.0. The gummy polymer has a $T_g$ (NMR) of −35° C. and a log $R_s$ of 5.7.

In two additional runs, II and III, additional phosphonium salt is mixed with the batch for 10 minutes just before extruding. The effect of the concentration of phosphonium salt on the conductivity of this polyether-ester is shown in Table III.

TABLE III

| Run | Phosphonium Sulfonate Mole% | Log $R_s$ |
|---|---|---|
| I | 8.7 | 5.7 |
| II | 12.5 | 5.5 |
| III | 16.0 | 5.4 |
| — | None | 8.5 |

EXAMPLE 3

This example illustrates the use of Salt A to improve the conductivity of another polyether-ester.

A still is charged with 3500 grams of polyethylene glycol having an average molecular weight of 400, 4500 grams of polyethylene glycol having an average molecular weight of 600, 250 grams of Salt A, 3880 grams of dimethyl terephthalate, 2480 grams of ethylene glycol, and 14.0 grams of tetrabutyl titanate. The temperature of the still is raised to 210° C. and about 1310 grams of methanol is removed by distillation. The batch is then transferred to an autoclave at 220° C. which has been purged with nitrogen. The autoclave is provided with an agitator which is operated at 15–30 rpm. The pressure is reduced to less than 2 torr in 45 minutes as the temperature is raised to 260° C. during this period. The batch is held at a pressure of less than 2 torr for 4 to 6 hours. The pressure is then brought to atmospheric with nitrogen and the batch is cooled to 220° C. and extruded under a blanket of nitrogen. The rubbery polymer contains 2.3 mole percent of the phosphonium sulfonate groups, has an inherent viscosity of 1.2 and has a log $R_s$ of 6.8.

A polyether-ester without the phosphonium salt is prepared by the above procedure using the following ingredients: 2950 grams of polyethylene glycol having an average molecular weight of 400, 4450 grams of polyethylene glycol having an average molecular weight of 600, 4000 grams of dimethyl terephthalate, 2480 grams of ethylene glycol, 300 grams of 1,3,5-trimethyl-2,4,6-tri(3,5-ditertiary butyl-4-hydroxybenzyl)benzene and 14.0 grams of tetrabutyl titanate. The log $R_s$ of the resulting polymer is 9.6.

EXAMPLE 4

This example illustrates the use of Salt A to improve the conductivity of a polyester.

An autoclave equipped with an agitator is charged with 2480 grams of di(2-hydroxyethyl)azelate, 680 grams of the di(2-hydroxyethyl)ester of dimer acid, 270 grams of Salt A, 700 grams of ethylene glycol, 5 grams of 2-ethyl-2-hydroxymethyl-1,3-propanediol and 1 milliliter of tetrabutyl titanate. Dimer acid is a 36-carbon, long-chain, aliphatic dibasic acid containing alkyl groups near the center of the molecule. The autoclave is purged with nitrogen and heated. The agitator is turned on at 8 rpm when the autoclave temperature is 150° C. Nitrogen is passed through the bottom of the clave to increase agitation of the contents. When the temperature reaches 180° C. the agitator speed is increased to about 24 rpm. The pressure is reduced to less than 50 torr. The batch is held at 240° C. for 2 hours and then at 260° C. for 4 hours at a pressure of less than 50 torr. At the end of this period the nitrogen and the agitator are turned off. The polymer is extruded at 260° C. under nitrogen. The rubbery polymer (essentially a random terpolyester of ethylene azelate-ethylene dimerate-ethylene tetra-n-butylphosphonium-sulfoisophthalate with 68.4/22.0/9.6 weight percentages, respectively) contains 4.9 mole % of phosphonium sulfonate groups and has a log $R_s$ of 6.7; without the phosphonium salt, the polymer has a log $R_s$ greater than 9.0.

EXAMPLE 5

This example illustrates the use of Salt A to improve the conductivity of another polyester.

A still is charged with 11,700 grams of dimethyl azelate, 2250 grams of 2,2-dimethyl-1,3-propanediol, 1360 grams (4.5 mole %) of Salt A, 100 grams of 2-ethyl-2-hydroxymethyl-1,3-propanediol, 4 grams of sodium acetate trihydrate, 11.2 grams of manganese acetate tetrahydrate, 7.7 grams of antimony oxide and 6200 grams of ethylene glycol. The temperature of the still is raised to 230° C. and about 2700 grams of methanol and about 1600 grams of ethylene glycol are removed by distillation. The batch is then transferred to an autoclave at 230° C. which has been purged with nitrogen and 8.3 milliliters of 85%, by weight, phosphoric acid is added. The autoclave is provided with an agitator which is operated at 30 rpm. The pressure is reduced to less than 2 torr and the temperature is raised to 270° C. The batch is held at 270° C. and at less than 2 torr for 4–5 hours. The pressure is then brought to 55 psig. with helium and extruded under a blanket of nitrogen. The resulting rubbery polymer has an inherent viscosity of 1.4, and by analysis is shown to contain 4.5 mol percent of the phosphonium sulfonate groups, has a log $R_s$ of 6.4, and a $T_g$ (NMR) of −22° C.; without the phosphonium salt added, the polymer has a log $R_s$ of 10.0.

EXAMPLE 6

This example illustrates the use of Salt A to improve the conductivity of yet another polyester.

Into a 1-liter, 3-necked flask fitted with a distillation condenser are placed 203 grams of azelaic acid, 61.2 grams of Salt A, 70.8 grams of 2-ethyl-2-methyl-1,3-propanediol, 124 grams of ethylene glycol, 6.7 grams of 2-ethyl-2-(hydroxymethyl)-1,3-propanediol, and 0.2 gram of zinc acetate. The flask contents are heated at 180° C. for 2 hours and a slow bleed of nitrogen through the contents is maintained. Then 3 drops of 85% phosphoric acid are added and the temperature is held at 180° C. for 1 hour. The reaction mixture is then cooled to 100° C. and the pressure slowly reduced to 1 torr. The temperature is kept at 100°–120° C. at a pressure of 1 torr until no more liquid distills over. Tetrabutyl titanate, 3 drops, is then added and the reaction mixture is heated to 240° C. at a pressure of 1 torr for 1 hour. The polymer is cooled under nitrogen. The gummy polymer contains 10 mole percent of the phosphonium sulfonate groups and has a log $R_s$ of 6.0. The polyester without the phosphonium salt has a log $R_s$ of 9.0.

EXAMPLE 7

This example illustrates the use of Salt C to improve the conductivity of a polyester.

A polyester is prepared as in Example 5 except 1360 grams of Salt C is used in place of the 1360 grams of Salt A. The resulting gummy polymer has a log $R_s$ of 6.3–6.5 and contains 3.5 mole percent phosphonium sulfonate groups.

EXAMPLE 8

This example illustrates the use of Salt D to improve the conductivity of a polyester.

A polyester is prepared as in Example 5 except 1360 grams of Salt D is used in place of the 1360 grams of Salt A. The resulting gummy polymer has an inherent viscosity of 0.9, a log $R_s$ of 6.2 and contains 3.3 mole % of the phosphonium sulfonate groups.

EXAMPLE 9

This example illustrates the use of Salts B, E, F, G and H to improve the conductivity of a polyester.

A round-bottom flask with a side-arm condenser to permit the removal of volatile products is charged with 62 grams of ethylene glycol, 117 grams of dimethyl azelate, 22.5 grams of 2,2-dimethyl-1,3-propanediol, 1.0 gram (except 10 grams for run using Salt E) of 2-ethyl-2-hydroxymethyl-1,3-propanediol, 0.04 gram sodium acetate trihydrate, 0.112 gram manganese acetate tetrahydrate, 0.077 gram of antimony oxide and 13.6 grams of the selected phosphonium salt except for Salt B where 15.4 grams are used. Five separate runs are made using Salts B and E-H. After heating at 180°–220° C. for 3–4 hours under a nitrogen blanket to remove methanol by-product by distillation, 0.08 milliliter of 85% phosphoric acid is added to the solution and a thin glass capillary tube for feeding nitrogen at atmospheric pressure is inserted below the liquid level. The temperature is raised to 260°–270° C. and vacuum is applied to the system at a pressure less than 10 torr. This vacuum pulls nitrogen through the capillary for agitation. The reaction is allowed to proceed for 6–7 hours except for the run involving Salt B when it is stopped after 4 hours. With the runs involving Salts E, F, G and H, a magnetic stirrer is also used. Properties for the resulting polymers are shown in Table IV.

TABLE IV

| Phosphonium Sulfonate Salt | Log $R_s$ | Phosphonium Sulfonate Mole % |
|---|---|---|
| Salt B | 7.4 | 4.8 |
| Salt E | 7.5 | 4.1 |
| Salt F | 6.8 | 3.2 |
| Salt G | 7.5 | 5.0 |
| Salt H | 6.5 | 2.2 |

EXAMPLE 10

This example illustrates the use of Salt J to improve the conductivity of an N-alkyl polcarbonamide.

The dry salt of N,N'-di(n-butyl)/N-(n-butylhexamethylene diammonium) (50/50 weight ratio) dodecanedioate (50 grams) and Salt J (1.5 grams) are sealed in an evacuated, heavy-walled polymer tube and heated for two hours at 220° C. Upon cooling the tube is opened and re-heated to 295° C. for two hours in a nitrogen atmosphere, then four hours at 295° C. at a pressure less than 2 torr. The rubbery polymer has a $T_g$ (NMR) of −35° C., a log $R_s$ of 7.2 and contains 2.7 mole % phosphonium sulfonate groups. The N-alkyl polycarbonamide log $R_s$ is 8.3 when the phosphonium salt is not added.

EXAMPLE 11

This example illustrates the use of Salt A to improve the conductivity of yet another polyester.

The procedure in Example 9 is followed to prepare a polyester where 117 grams dimethyl azelate, 34.6 grams trimethyl hexanediol, 62 grams of ethylene glycol, 13.6 grams of Salt A, 1.0 gram of 2-ethyl-2-hydroxymethyl-1,3-propanediol, 0.112 gram manganese acetate tetrahydrate, and 0.077 gram antimony oxide is used. Phosphoric acid was added in the same amount and manner as described in Example 9 and the same polymerization conditions are used. The polymer produced is syrupy, has a log $R_s$ of 6.4, and contains 4.5 mole % phosphonium sulfonate groups.

EXAMPLE 12

This example illustrates the use of a polyetherester of Example 2 to provide antistatic carpet fibers.

The composition of Table III, Run I of Example 2 (log $R_s$ of 5.7) is spun as 50% core in poly(hexamethylene adipamide) filaments. The conductive polymer was fed through capillary tubing into the spinneret orifice for control of the position of the core material in the coextruded sheathcore filaments. The 10-filament yarn is drawn 3.2X and the denier of the drawn filaments is 20. Twelve of the 200-denier drawn yarns are plied and then bulked using a hot-air jet. A carpet is tufted from the bulked yarn and mock-dyed according to the following procedure: The carpet is first scoured in a bath of cold water containing 0.01% of trisodium phosphate and 0.01% surfactant, by weight. The temperature of the bath is raised to 76.7° C. at a rate of about 1.7° C. per minute and held for 30 minutes. The carpet is rinsed with cold water for 10 minutes. The carpet is then placed in a mock-dye bath at 26.7° C. having a pH of 5.9–6.0. The bath temperature is raised to 97.8° C. at a rate of about 1.7° C. per minute and held for 60 minutes. The carpet is rinsed in cold water for 10 minutes and dried at 121° C. It is hand latexed and dried at 121° C. The static propensity of the carpet, as determined by the shuffle test, is only 1.6 kilovolts. Without antistatic agents, the static propensity of nylon 6/6 carpets exceeds 10 kilovolts.

EXAMPLE 13

The composition of Run VII of Example I, which has a log $R_s$ of 7.5, is spun as 2.3% core in poly(hexamethylene adipamide) filaments. A 10-filament yarn made therefrom is drawn to a denier of 30. The yarn is 2-plied and woven as the filling in a fabric. After boiling the fabric in water for 3 hours, drying and applying a conductive silver paint, the filament log rho is 9.9.

EXAMPLE 14

The polyester prepared in Example 4 (log $R_s$ of 6.7) is spun as 8% core in five filaments of a 10-filament yarn. The filaments have a trilobal cross-section. The polymer of the sheath is prepared from the salt of bis(4-aminocyclohexyl)methane (containing about 70% of the transtrans stereoisomer) and dodecanedioic acid. The yarn is drawn to a denier of 30. The yarn is 2-plied and woven as the filling in a fabric, a conductive silver paint applied, and the log rho determined. The yarn is also used to knit a tricot fabric for preparing half-slips for sail testing. Control yarns without the core but otherwise the same also are evaluated. Log rho and sail test results are given in Table V.

TABLE V

| Antistatic Yarn | Log Rho After 30 "C" Washes | Fabric Decling Time, Min., After 30 "C" Washes |
|---|---|---|
| Sheath-Core Filaments | 9.7 | 1.4 |
| Control | >13.1 | >10 |

EXAMPLE 15

The composition prepared in Run VI of Example 1 is spun as 3.6% core as in Example 14 using the sheath polymer of that example.

EXAMPLE 16

This example illustrates the use of the composition prepared in Example 3 in polyester fibers. The polyether-ester, with and without the phosphonium sulfonate modification, are spun as 2% core in polyethylene terephthalate continuous filament yarns of 34 filaments. The polyethylene terephthalate polymer has a relative viscosity of 30 and contains 0.3% of $TiO_2$. The relative viscosity is determined using a 10%, by weight, based on total weight, solution of polymer in a mixture of 10 parts, by weight, of phenol and 7 parts of 2,4,6-trichlorophenol. The yarn is drawn to a denier of 150, woven as the filling in a fabric, a conductive silver paint applied, and the log rho determined. Skirts were made from textured yarn double-knit, dyed fabrics (0.07 gms./cm.²) and tested in a sail test against a nylon fabric. The values for log rho and decling time are given in Table VI.

TABLE VI

| Core | Log Rho After 10 "C" Washes | Decling Time, Min. After 30 "C" Washes |
|---|---|---|
| Polyether-ester Having Phosphonium-Sulfonate Units | 9.7 | 0.5 |

TABLE VI-continued

| Core | Log Rho After 10 "C" Washes | Decling Time, Min. After 30 "C" Washes |
|---|---|---|
| Polyether-ester only | 11.0 | 1.7 |
| None | >13.1 | >10 |

EXAMPLE 17

The polyester prepared in Example 5 (log $R_s$ of 6.4) is spun as 4% core in 5 filaments of a 10-filament yarn as in Example 14. The filaments have a trilobal cross-section. The polymer of the sheath of the 5 sheath/core filaments is the same as that of Example 14, the other 5 filaments are spun from a copolymer of the polymer of the sheath that contains 8 mole percent isophthalamide units and 92 mole percent dodecanedioamide units. Half-slips made from finished tricot fabric of this yarn after 30 "C" washes gives an average decling time of 3.9 minutes while the control has greater than 10 minutes decling time.

EXAMPLE 18

The polyester of Example 7 is spun as 4% core in 9 filaments of an 18-filament yarn. The filaments have a trilobal cross-section. The polymer of the sheath is the same as that of Example 14 and the polymer of the other 9 filaments is the copolymer of Example 17. The yarn is drawn to a denier of 30. Half-slips were made from finished tricot fabric of this yarn.

EXAMPLE 19

The polyester in Example 8 is spun as a 5.8% core in a 34-filament yarn. The filaments have a round cross-section. The polymer of the sheath is the same as that of Example 14. The yarn is drawn to a denier of 150 and is woven into fabric, heat-set for 20 seconds at temperatures of 121.1° C., 171.1° C. and 190.6° C. The fabric is scoured for 20 minutes at 71.1° C. in a bath containing 0.01% trisodium phosphate and 0.05% of an ionic surfactant. The fabric is rinsed, dried and a conductive silver paint applied. The log rho of the filaments is found to be 9.7. Filaments without the antistat treated in the same manner have a log rho of about 11.6.

EXAMPLE 20

The polyester of Example 9 wherein Salt F was employed is dispersed in polypropylene at a concentration of 3% and spun into a 5-filament yarn. The filaments have a round cross-section. The yarn is drawn 2X and is plied to give a yarn having a denier of 100 and woven into fabric. The fabric is scoured at 100° C. in a 0.2% trisodium phosphate solution, dried and a conductive silver paint applied. The filaments are found to have a log rho of 10.8. Filaments without the antistat treated in the same manner have a log rho of 12.7.

What is claimed is:

1. A conductive N-alkyl polyamide having a glass transition temperature measured by nuclear magnetic resonance peak ratio of less than 25° C, a log $R_s$ of less than 10 and having units containing phosphonium sulfonate groups of the formula

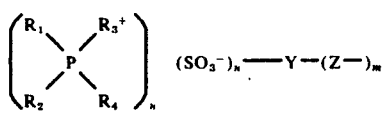 

where $R_1$, $R_2$, $R_3$ and $R_4$ represent monovalent hydrocarbon groups with the proviso that $R_1$ and $R_2$ may jointly represent an alkylene group, Y is a hydrocarbon group of up to 24 carbon atoms in which any unsaturation is aromatic and which may be interrupted by oxygen, sulfonamide or sulfonyl groups, Z is selected from the group consisting of

—O— and $$-\underset{\underset{\text{O}}{\|}}{\text{C}}-$$

wherein R is hydrogen or an alkyl group of 1–18 carbon atoms and $n$ and $m$ are 1 or 2, said groups being present in an amount of from 0.01 mol % to about 50 mol % based on the total mols of dicarboxylic acid units and/or aminocarboxylic acid units in the polymer chain.

2. The polymer of claim 1 wherein the unit containing the phosphonium sulfonate group is a phosphonium 3,5-dicarbonylbenzene sulfonate unit.

3. The polymer of claim 1 having a log $R_s$ of less than 8.

* * * * *